Figure 1:
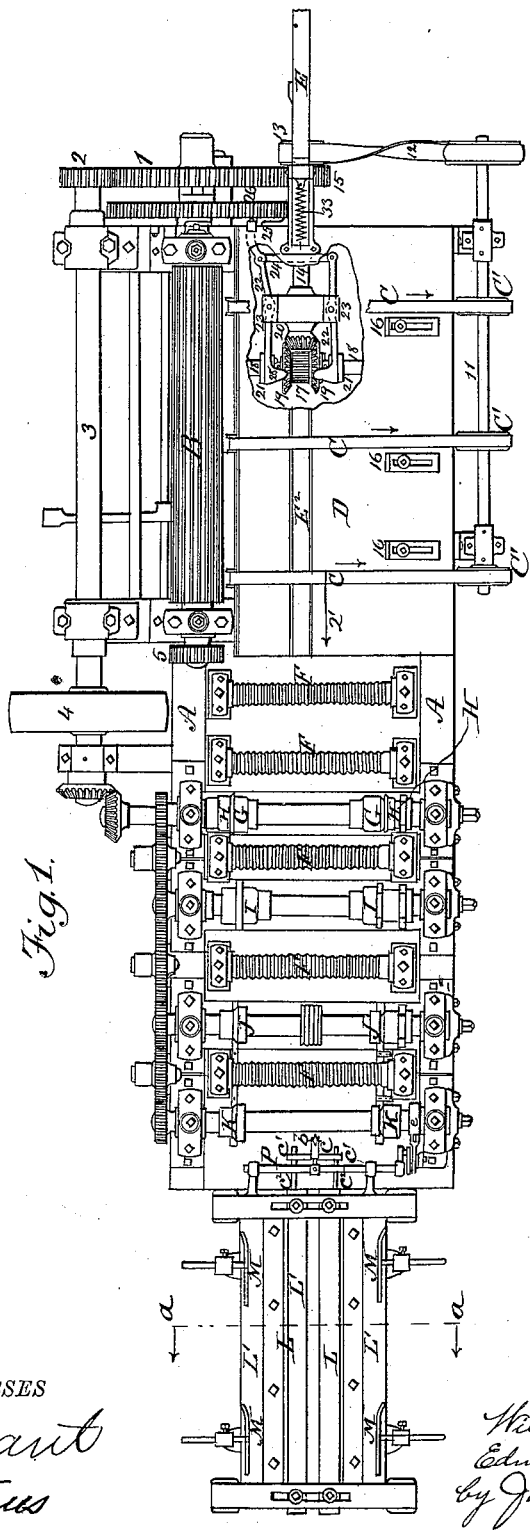

(No Model.) 15 Sheets—Sheet 1.

W. J. GORDON & E. D. GILBERT.
MACHINE FOR MAKING SHEET METAL WATER CONDUCTORS.

No. 343,024. Patented June 1, 1886.

WITNESSES
INVENTORS:
Attorneys.

(No Model.) 15 Sheets—Sheet 2.
W. J. GORDON & E. D. GILBERT.
MACHINE FOR MAKING SHEET METAL WATER CONDUCTORS.
No. 343,024. Patented June 1, 1886.

WITNESSES
INVENTORS:
William J. Gordon
Edmund D. Gilbert
by Johnson and Johnson
Attorneys.

(No Model.) 15 Sheets—Sheet 3.

W. J. GORDON & E. D. GILBERT.
MACHINE FOR MAKING SHEET METAL WATER CONDUCTORS.

No. 343,024. Patented June 1, 1886.

WITNESSES

INVENTORS:
William J. Gordon,
Edmund D. Gilbert,
by Johnson and Johnson
Attorneys.

(No Model.) 15 Sheets—Sheet 4.
W. J. GORDON & E. D. GILBERT.
MACHINE FOR MAKING SHEET METAL WATER CONDUCTORS.
No. 343,024. Patented June 1, 1886.
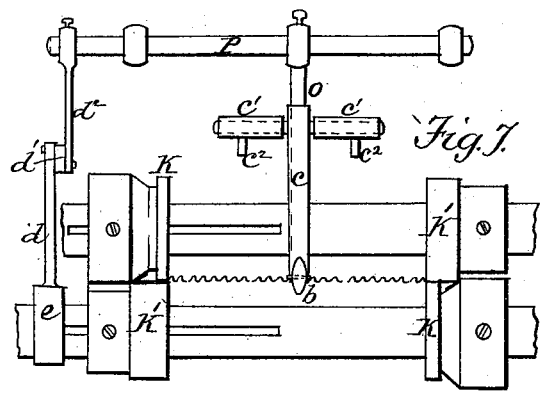
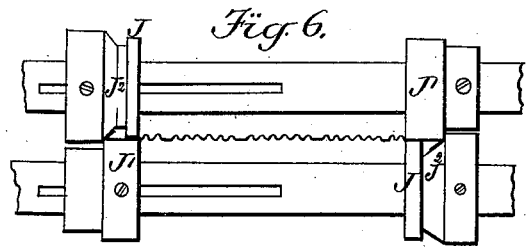
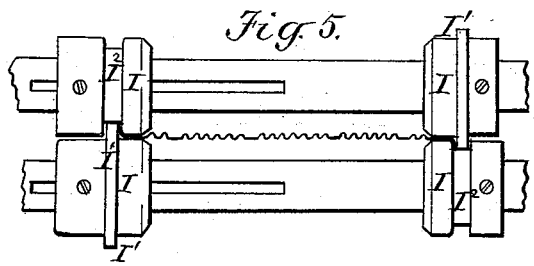
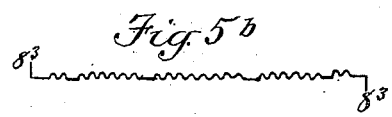
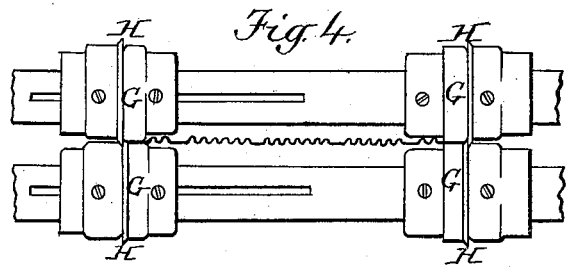
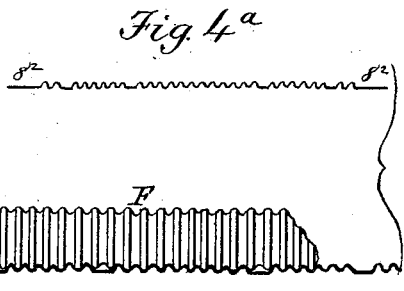
WITNESSES
R. E. Grant
W. E. Stearns
INVENTORS:
William J. Gordon,
Edmund D. Gilbert
by Johnson & Johnson
Attorneys.

(No Model.) 15 Sheets—Sheet 5.
W. J. GORDON & E. D. GILBERT.
MACHINE FOR MAKING SHEET METAL WATER CONDUCTORS.
No. 343,024. Patented June 1, 1886.
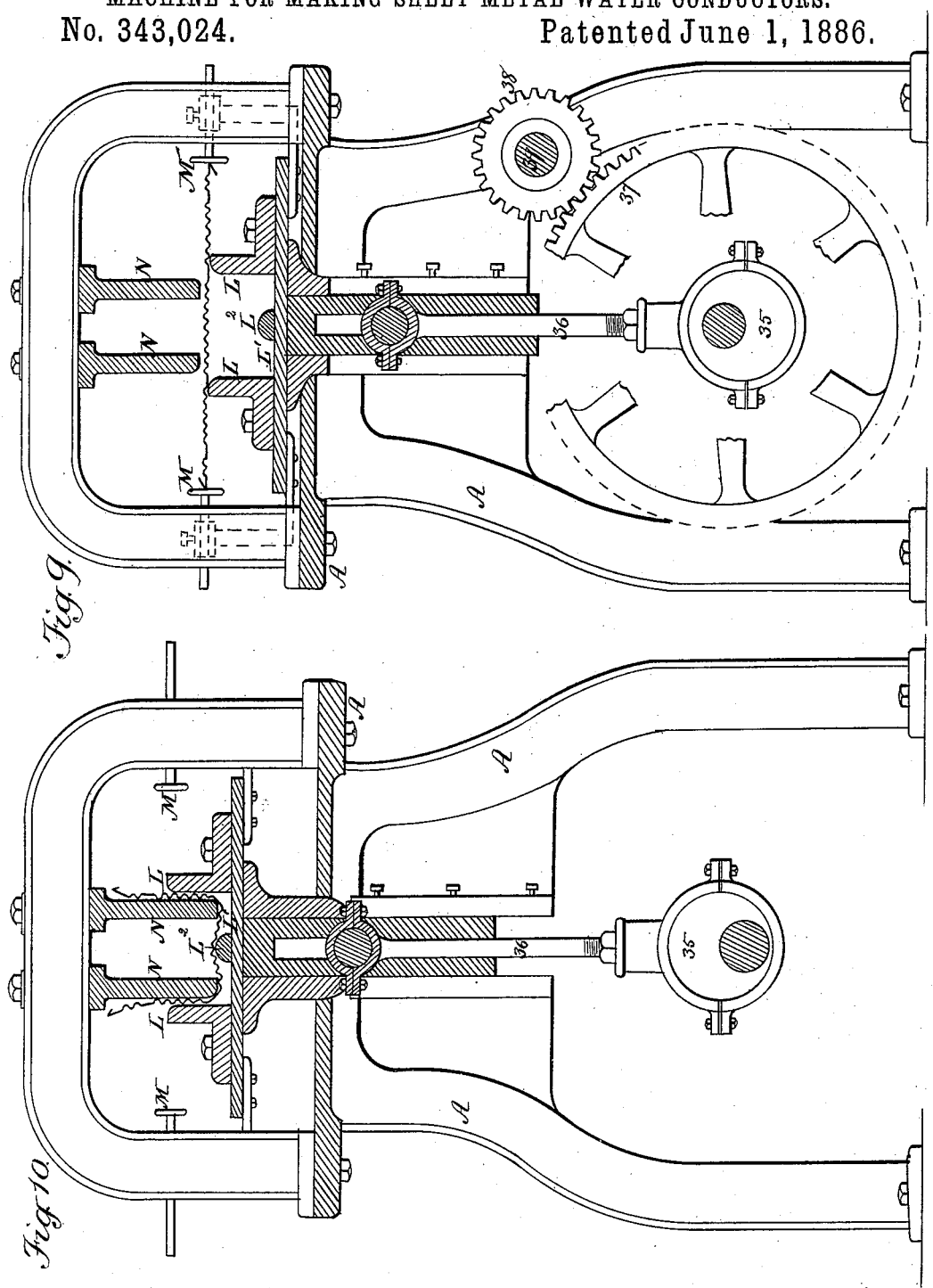
WITNESSES
INVENTORS:
William J. Gordon,
Edmund D. Gilbert
by Johnson & Johnson
Attorneys.

(No Model.) 15 Sheets—Sheet 6.

W. J. GORDON & E. D. GILBERT.
MACHINE FOR MAKING SHEET-METAL WATER CONDUCTORS.

No. 343,024. Patented June 1, 1886.

WITNESSES
INVENTORS:
William J. Gordon
Edmund D. Gilbert
by Johnson and Johnson
Attorneys.

(No Model.) 15 Sheets—Sheet 7.

W. J. GORDON & E. D. GILBERT.
MACHINE FOR MAKING SHEET METAL WATER CONDUCTORS.

No. 343,024. Patented June 1, 1886.

WITNESSES

INVENTORS:
William J. Gordon,
Edmund D. Gilbert,
by Johnson & Johnson
Attorneys.

(No Model.) 15 Sheets—Sheet 8.

W. J. GORDON & E. D. GILBERT.
MACHINE FOR MAKING SHEET METAL WATER CONDUCTORS.

No. 343,024. Patented June 1, 1886.

WITNESSES

INVENTORS:—
William J. Gordon,
Edmund D. Gilbert
by Johnson and Johnson
Attorneys (No Model.) 15 Sheets—Sheet 9.

W. J. GORDON & E. D. GILBERT.
MACHINE FOR MAKING SHEET METAL WATER CONDUCTORS.

No. 343,024. Patented June 1, 1886.

WITNESSES
R. E. Grant
W. E. Stearns

INVENTORS:—
William J. Gordon
Edmund D. Gilbert
by Johnson and Johnson
Attorneys (No Model.) 15 Sheets—Sheet 10.

W. J. GORDON & E. D. GILBERT.
MACHINE FOR MAKING SHEET METAL WATER CONDUCTORS.

No. 343,024. Patented June 1, 1886.

WITNESSES
R. E. Grant
W. E. Stearns

INVENTORS:—
William J. Gordon
Edmund D. Gilbert
by Johnson and Johnson
Attorneys.

(No Model.) 15 Sheets—Sheet 11.
W. J. GORDON & E. D. GILBERT.
MACHINE FOR MAKING SHEET METAL WATER CONDUCTORS.
No. 343,024. Patented June 1, 1886.
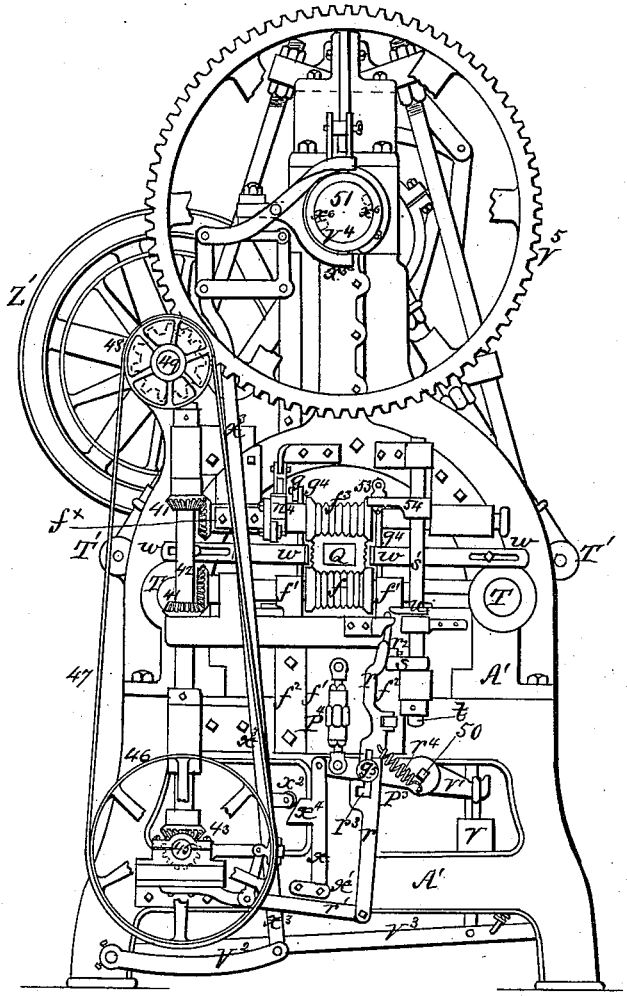
Fig. 18.
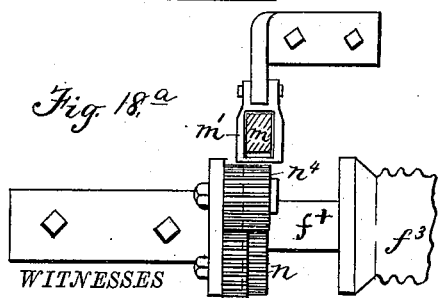
Fig. 18ª
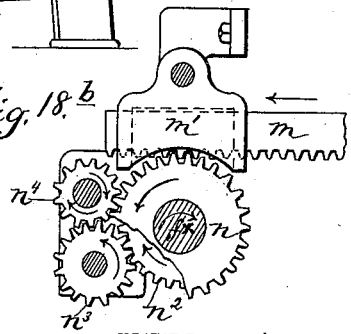
Fig. 18ᵇ
WITNESSES
INVENTORS:—
William J. Gordon
Edmund D. Gilbert
by Johnson and Johnson
Attorneys.

(No Model.) 15 Sheets—Sheet 12.

W. J. GORDON & E. D. GILBERT.
MACHINE FOR MAKING SHEET METAL WATER CONDUCTORS.

No. 343,024. Patented June 1, 1886.

WITNESSES
R. E. Grant
W. E. Liarus

INVENTORS:
William J. Gordon,
Edmund D. Gilbert,
by Johnson & Johnson
Attorneys (No Model.) 15 Sheets—Sheet 13.

W. J. GORDON & E. D. GILBERT.
MACHINE FOR MAKING SHEET METAL WATER CONDUCTORS.

No. 343,024. Patented June 1, 1886.

WITNESSES
INVENTORS
William J. Gordon
Edmund D. Gilbert
by Johnson & Johnson
Attorneys.

(No Model.) 15 Sheets—Sheet 14.
W. J. GORDON & E. D. GILBERT.
MACHINE FOR MAKING SHEET METAL WATER CONDUCTORS.
No. 343,024. Patented June 1, 1886.
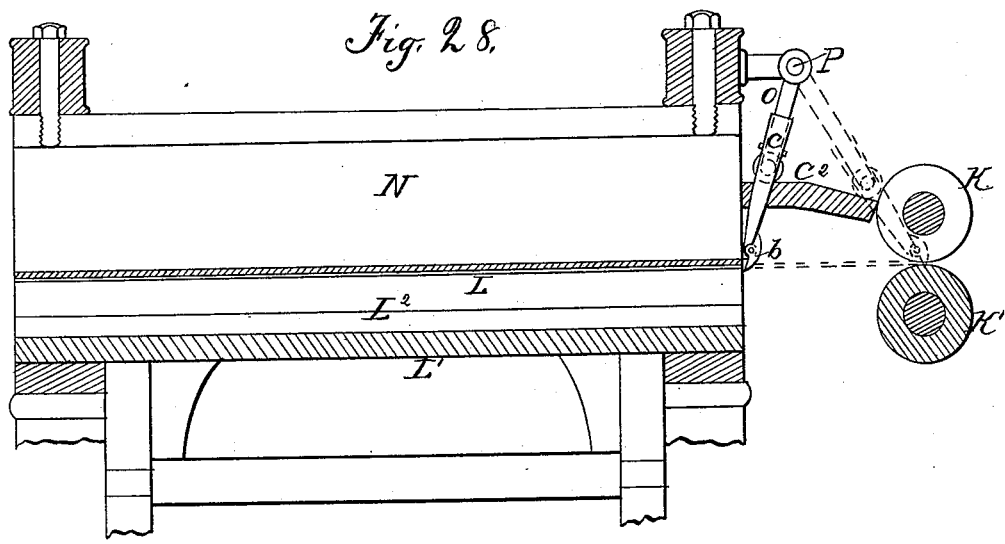
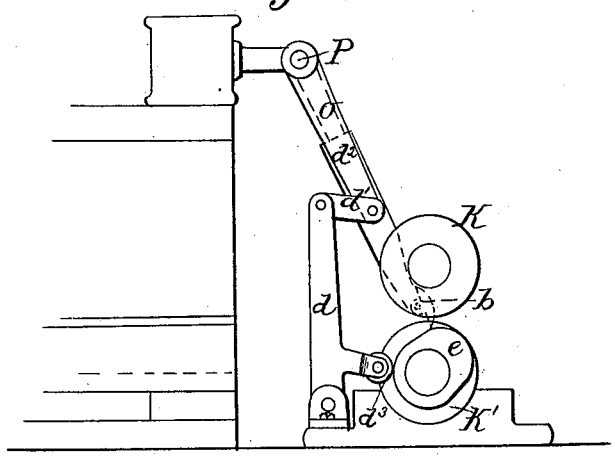
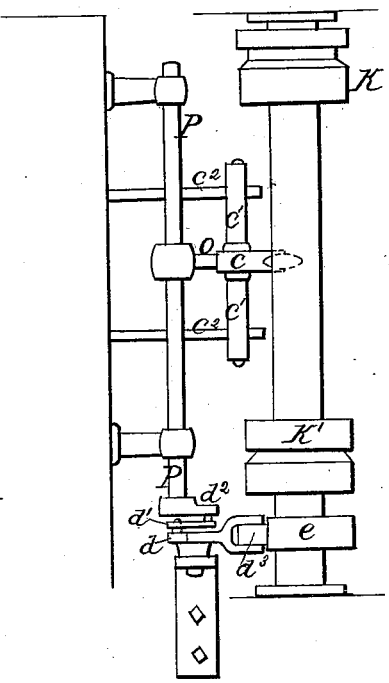
WITNESSES
INVENTORS:—
William J. Gordon
Edmund D. Gilbert
by Johnson & Johnson
Attorneys (No Model.) 15 Sheets—Sheet 15.
W. J. GORDON & E. D. GILBERT.
MACHINE FOR MAKING SHEET METAL WATER CONDUCTORS.
No. 343,024. Patented June 1, 1886.
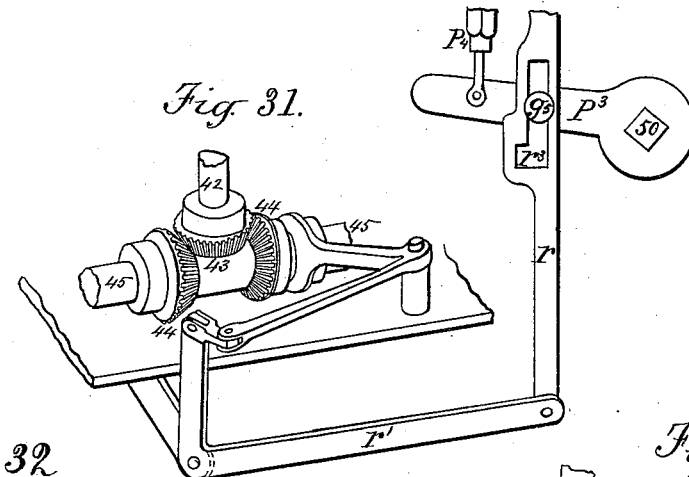
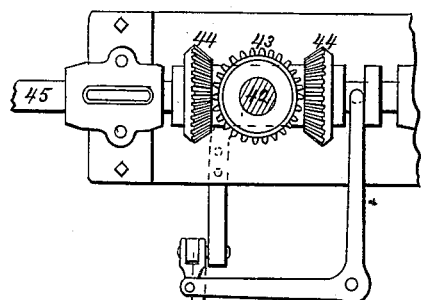
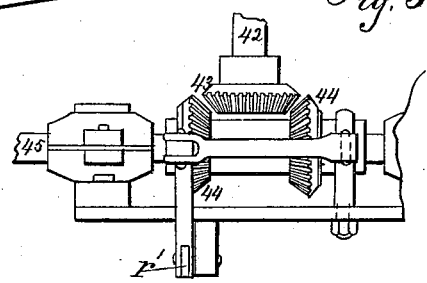
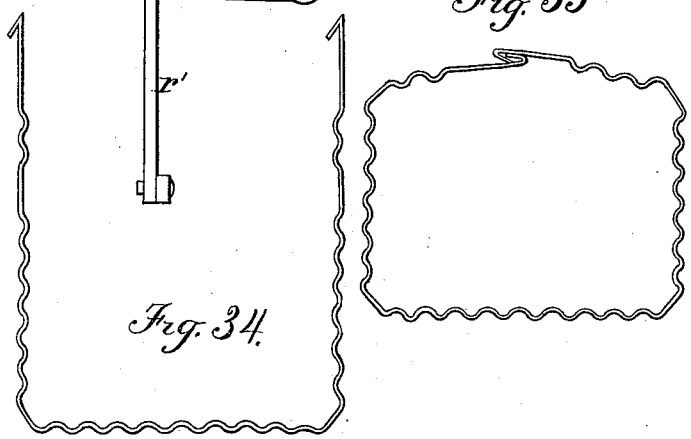
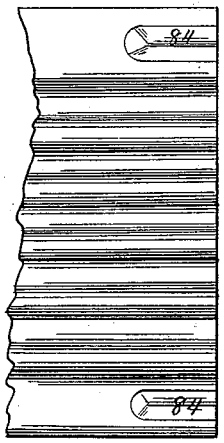
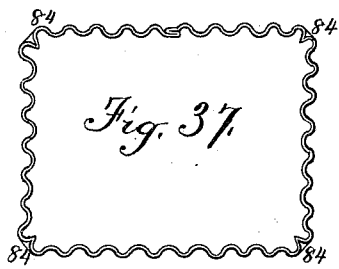
WITNESSES
INVENTORS:—
William J. Gordon
Edmund D. Gilbert
by Johnson & Johnson
Attorneys.

United States Patent Office.

WILLIAM J. GORDON AND EDMUND D. GILBERT, OF PHILADELPHIA, PA.

MACHINE FOR MAKING SHEET-METAL WATER-CONDUCTORS.

SPECIFICATION forming part of Letters Patent No. 343,024, dated June 1, 1886.

Application filed October 21, 1885. Serial No. 180,550. (No model.)

*To all whom it may concern:*

Be it known that we, WILLIAM J. GORDON and EDMUND D. GILBERT, citizens of the United States, residing at the city and county of Philadelphia, and State of Pennsylvania, have invented new and useful Improvements in Machines for Making Sheet-Metal Water-Conductors, of which the following is a specification.

Our invention comprises mechanism operated by power for producing at one continuous operation sheet-metal water-conductors, such as are used for carrying the rain-water to the surface of the ground or to receivers, and particularly such conductors as are corrugated to allow for expansion to prevent bursting under the expansive force of ice which may be frozen therein. In such organized mechanism the sheet of a proper size for a section of the conductor is first fed through corrugating-rolls, then, in a line at right angles to its first movement, it is moved to and subjected to the successive operations of having its edges trimmed, bent at right angles in opposite directions, and then bent to acute angles to form the seam-lap, then the sheet is bent into a U or trough form, and then subjected to the final operation of lapping the seam-sides, hooking the seam-forming laps, and compressing the seam in the finishing operation of setting the conductor to its proper shape on a suspended core or form which has a vertical and a horizontal movement to form and then to carry and deliver the completed conductor from between the die-jaws. In the compound movement of the die-core it carries the finished conductor out of the machine and is returned without the conductor to receive the succeeding troughed sheet. In these several steps of operation before stated it is important that surfaces of the sheet be left uncorrugated at the seam-forming edges and at the spaces which form the angles or corners of the conductor, to allow for feeding the sheet through the trimming and edge-bending rolls by the action of the latter upon such plain margins. It is also important that the completing operation of the conductor should also complete the corrugations of the conductor in the plain surfaces of the seam-forming sides and at the same time set the corrugations at the proper depth.

Figure 2:
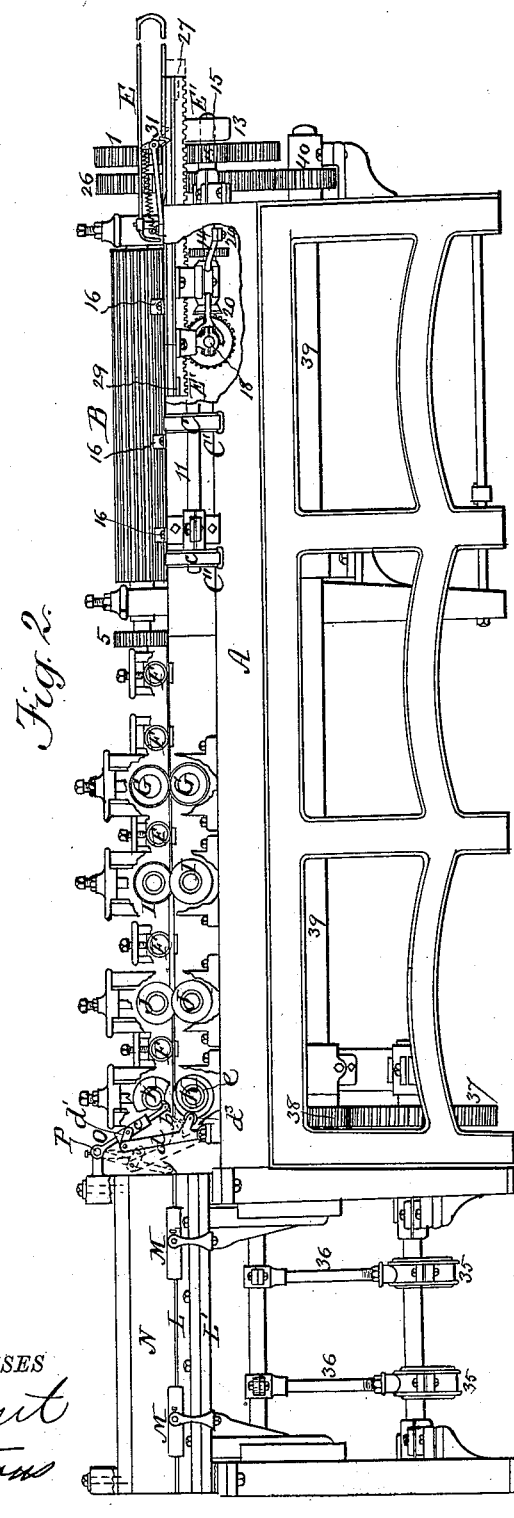
Figure 3:
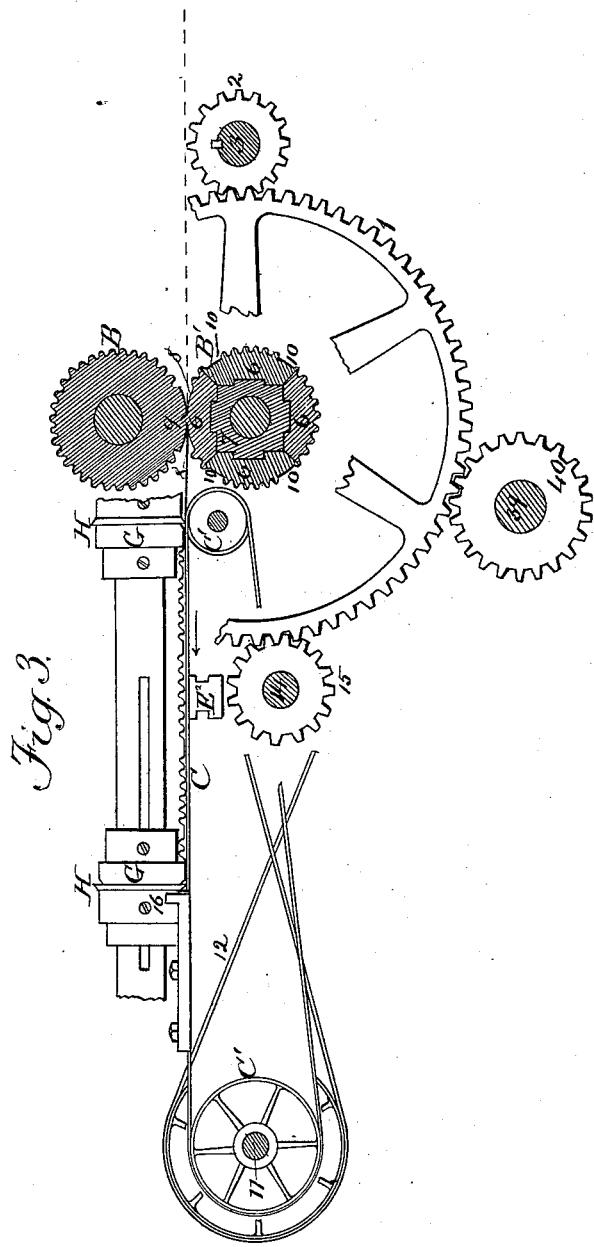
Figure 11:
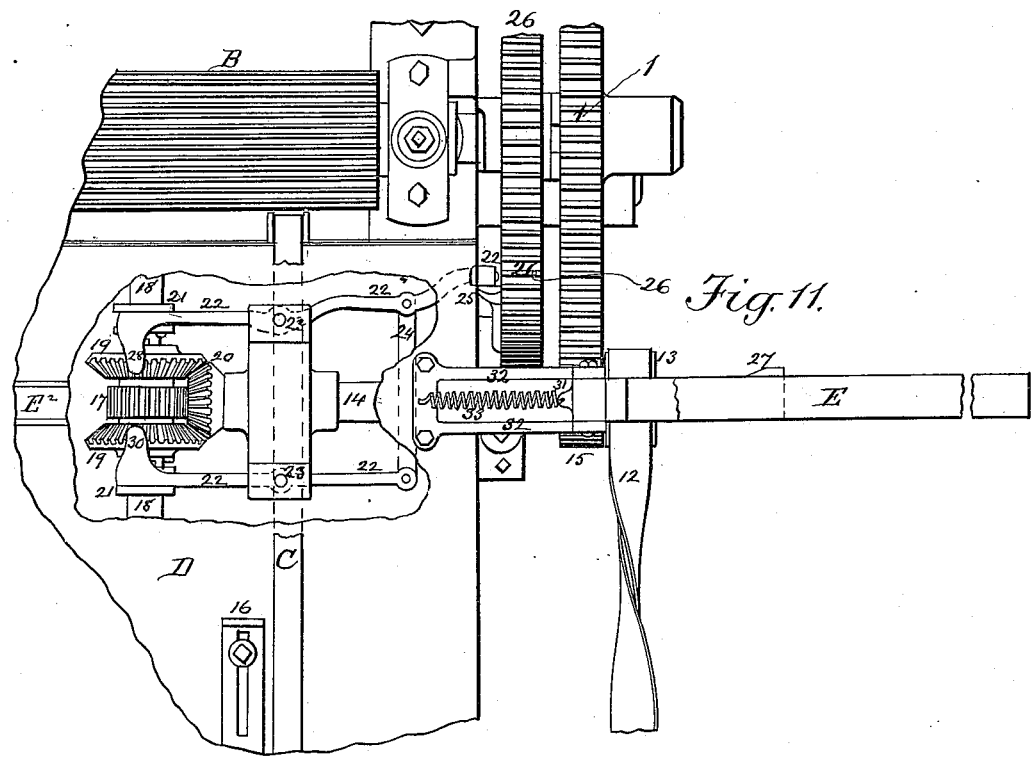
Figure 13:
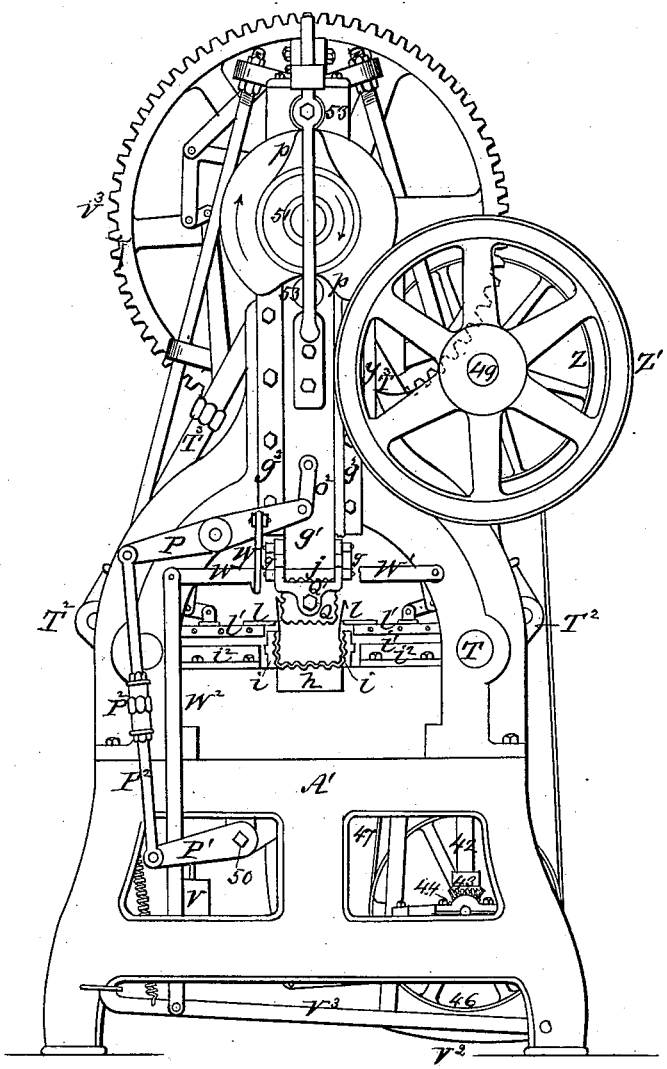
Figure 14:
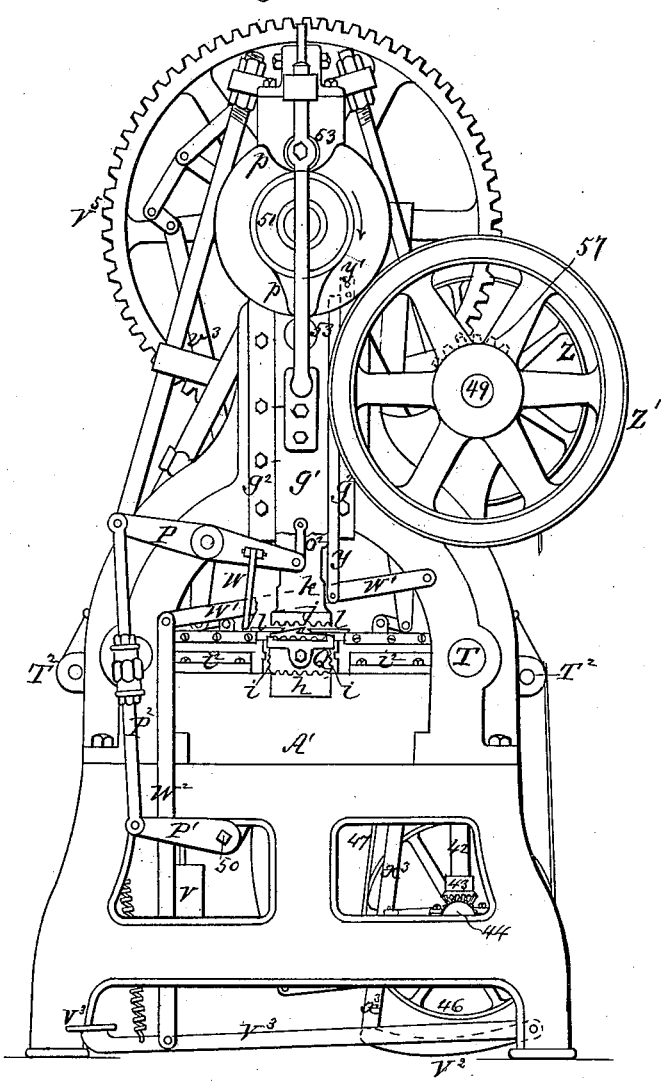
Figure 15:
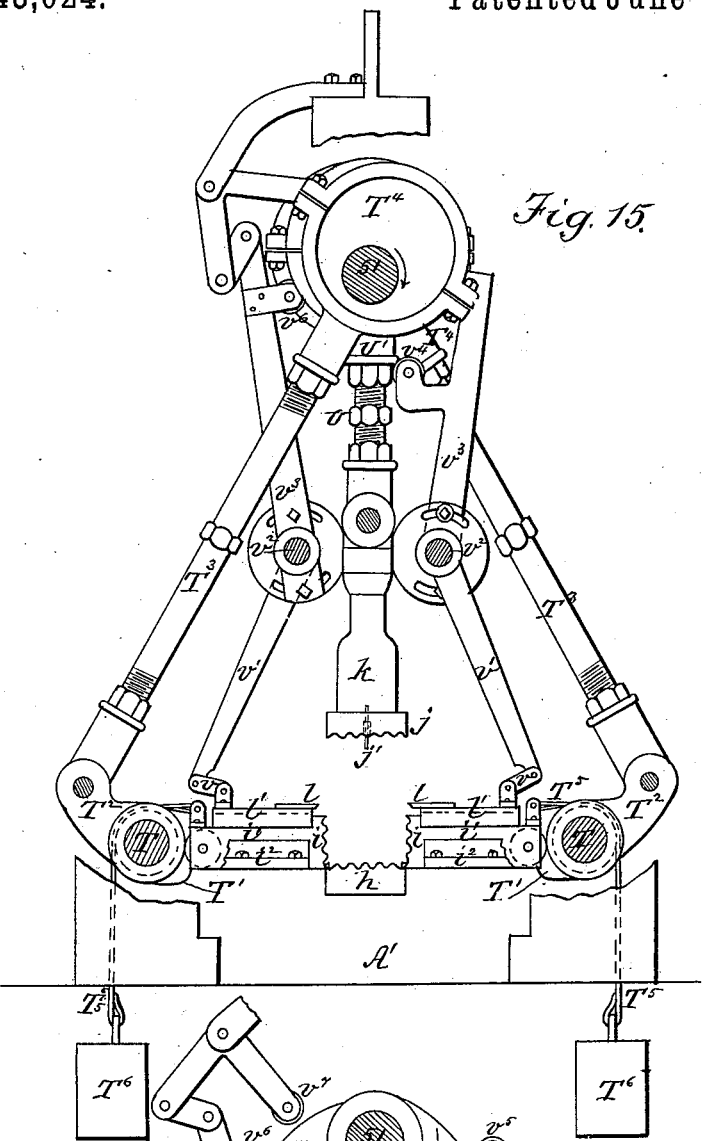
Figure 16:
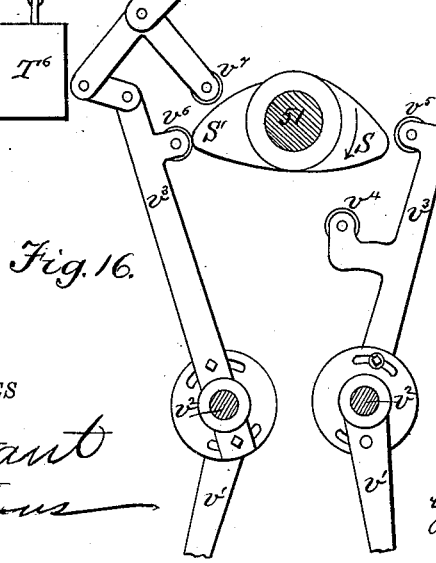
Figure 17:
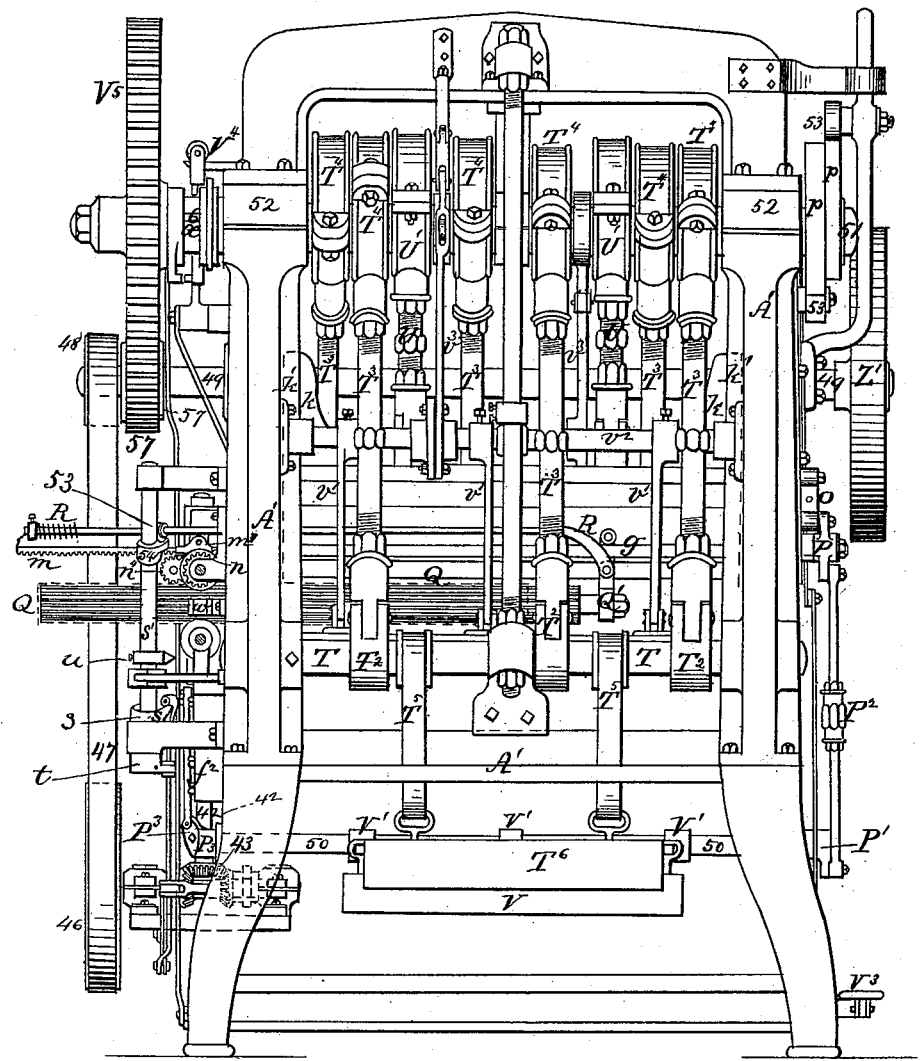
Figure 19:
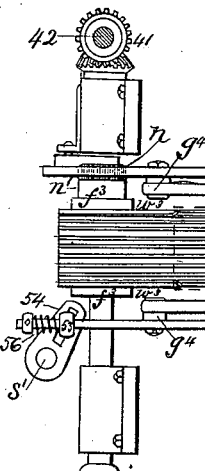
Figure 24:
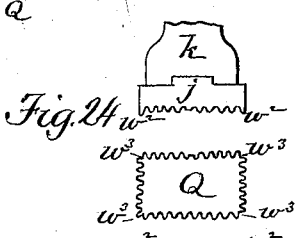
Figure 23:
Figure 21:
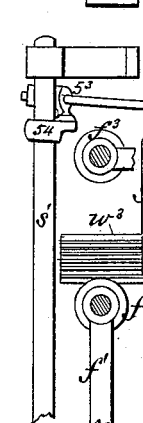
Figure 22:
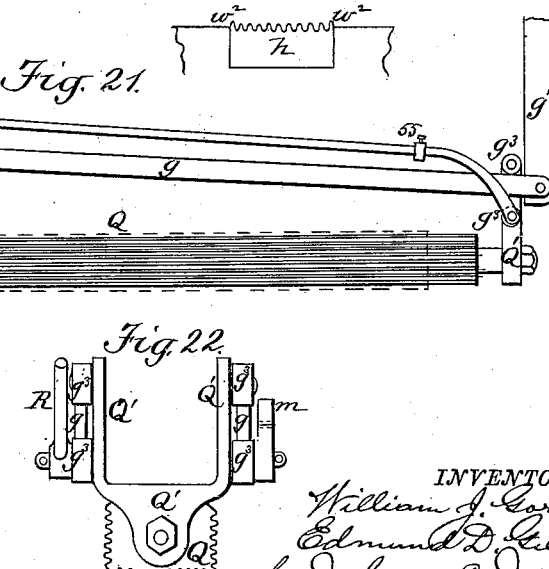
Figure 25:
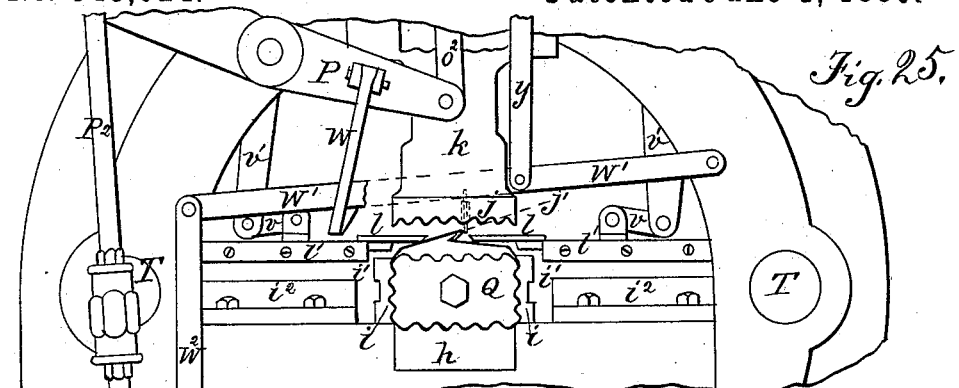
Figure 26:
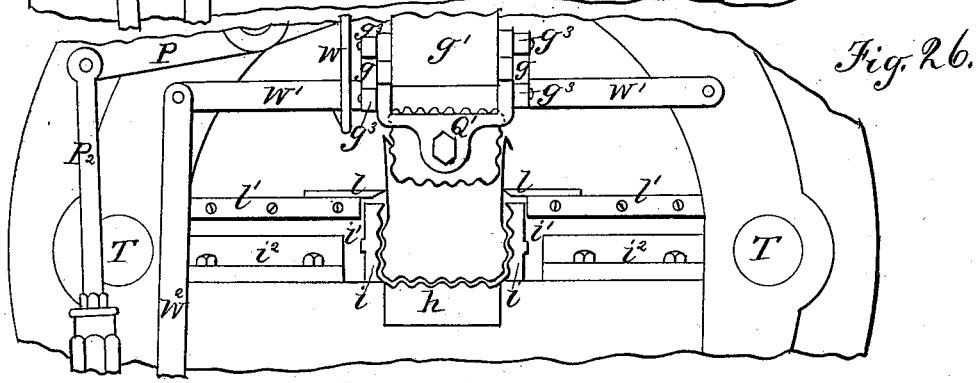
Figure 27:
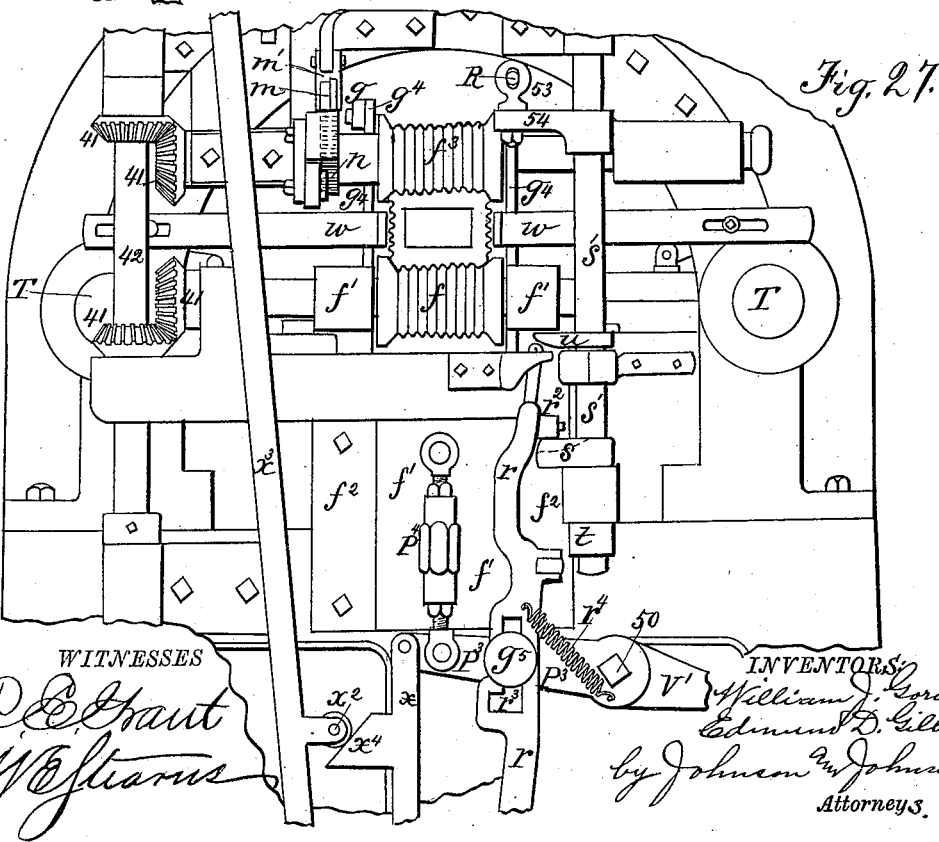

The accompanying drawings illustrate mechanism by which our invention is carried into effect, and in which Figure 1, Sheet 1, represents in top view so much of the power-operated mechanism as corrugates the sheet and delivers it upon a table in position to be moved for continuous operation in a direction at right angles to the movement in which it was corrugated, to trim, bend, and set the edges of the sheet and form it into a U or trough shape; Fig. 2, Sheet 2, a side elevation of the same, the housings of the trimming, edge-bending, and hook-forming rolls being broken away to show the path of the corrugated plate. Fig. 3, Sheet 3, represents in vertical cross-section the corrugating-rolls and the table upon which the corrugated sheet is delivered for continuous operation by carrying-belts. Fig. 4, Sheet 4, represents in elevation the edge-trimming rolls for trimming the edges of the corrugated sheet, as seen in the cross section of said sheet in Fig. $4^a$, which represents the corrugated sheet and the relation of its guide-rolls thereto. Fig. 5 represents in elevation the rolls for bending the edges of the sheet at right angles in opposite directions, as seen in cross-section of said sheet, Fig. $5^b$. Fig. 6, Sheet 4, represents in elevation the rolls for hook-forming the bent edges of the corrugated sheet, as seen in the cross-section of said sheet, Fig. $6^c$; and Fig. 7, Sheet 4, represents in elevation the rolls for completing the hook-forming of the edges in proper shape for hooking and forming the seam of the conductor, as in the cross-section of said sheet, Fig. $7^d$, also showing the vibrating catch by which the sheet is delivered into a former, where it is bent into a trough shape. Fig. 8, Sheet 4, shows in cross-section the guides by which the sheet is held and guided in passing from the rolls, Figs. 6 and 7, into the trough-former. Fig. 9, Sheet 5, represents a cross-section of the former, showing the corrugated sheet in position upon its vertically-moving table just previous to being formed into a U or trough shape; and Fig. 10, Sheet 5, a similar cross-section showing the corrugated sheet formed into a trough shape, both said sections being taken on the line *a a* of Fig. 1. Fig. 11, Sheet 6, represents in top view the sheet push-bar and its operating devices enlarged; and Fig. 12, Sheet 6, a side view of the same, the said push-bar being nearly at the extremity of its outward movement in both views. Fig. 13, Sheet 7, represents the front end of that part of the mechanism in which the conductor is completed, the core or form and the forming dies or jaws being in the positions they occupy to receive the trough shaped sheet. Fig. 14, Sheet 8, represents a similar view showing the form depressed upon the sheet and the lapping or bending jaws in the positions they occupy in the operation of lapping the sides of the sheet and hooking the seam. Fig. 15, Sheet 9, represents the die or jaw-forming and edge-lapping parts and their operating connections in open positions. Fig. 16, Sheet 9, represents in detail the cams and connections for operating the lapping or bending jaws. Fig. 17, Sheet 10, represents in side elevation the conductor-completing part of the mechanism shown in vertical sections and in detail in Figs. 13, 14, 15, and 16. Fig. 18, Sheet 11, represents the rear end of such part of the mechanism. Fig. 18$^a$ represents in top view a detail of the reverse gear for the core-operating rack-bar, and Fig. 18$^b$ a vertical sectional view of the same. Fig. 19, Sheet 12, represents a top view of the form or core and the relation thereto of the core or form carriage and of the ways or rails by which the latter is suspended and upon which it travels, and the means for traversing said form-carriage; and Fig. 20, Sheet 12, represents a side view of the parts shown in Fig. 19, the core or form, its carriage, and the ways upon which the latter travels being shown in their raised positions, as in Fig. 13; and Fig. 21, Sheet 12, represents a similar view showing the core or form, its carriage, and the ways upon which the latter travels in their depressed positions, as in Fig. 14, to bring the form between the side dies. Fig. 22, Sheet 12, represents the front end view of the suspended form or core, its carriage, and ways. Fig. 23, Sheet 12, is the receiving end of the form or core, and Fig. 24, Sheet 12, the delivery end of the form or core and the top and bottom die-jaws, showing the construction for swaging in the corners of the conductor. Fig. 25, Sheet 13, represents in enlarged view the conductor-forming parts in the positions shown in Fig. 14. Fig. 26, Sheet 13, represents in enlarged view the the conductor-forming parts in the positions shown in Fig. 13. Fig. 27, Sheet 13, represents in enlarged view the conductor-forming parts in the positions shown in Fig. 18. Fig. 28, Sheet 14, represents in vertical longitudinal section the trough-former and the sheet-transferring catch device, the latter being shown in full lines in the position it occupies when the sheet is transferred into the trough-former and in dotted lines in the position it takes the sheet from the rolls. Fig. 29 represents a side view of the catch device, showing the operating connections, and Fig. 30 a top view of the same. Fig. 31, Sheet 15, represents in perspective the clutch, and its connections, which operates the driving mechanism, which operates the form or core horizontally, as shown in Fig. 17; Fig. 32, a top view, and Fig. 33 a side view, of the same. Fig. 34 shows the troughed sheet. Fig. 35 shows the troughed sheet with its seam-forming edges lapped. Fig. 36 shows the end of the conductor having the swaged-in corner-recesses to facilitate telescoping the sections; and Fig. 37 shows in end view the completed conductor having the swaged-in corner recesses.

In the organization of the mechanism the corrugating, edge-trimming, edge-bending and hook-forming, and trough-forming appliances are preferably mounted upon a frame, A, so that the sheet being entered at one end thereof at right angles to the length of said frame is, after being corrugated, carried to the trough-forming end thereof in the direction of the length of said frame. The corrugating-rolls B and B' are mounted in suitable bearings at the side of the frame, Fig. 1, at its front end, one above the other, the lower roll-shaft being operated by a large clutch-gear, 1, which meshes with a pinion, 2, on a driving-shaft, 3, mounted at the side of the frame in front of the rolls, and having the driving-pulley 4, as shown in Fig. 1. The rolls are geared together at their inner ends by equal pinions 5, for equal speed and positive motion, and their surface corrugations are suited to the size and style of the conductor to be formed. The lower roll is preferably formed of removable sections 6, Fig. 3, fitted upon a core, 7, and secured by screws and by tongues and grooves, as shown, so that they may be removed and replaced by other sections having the same form of corrugations suited to different sizes of conductors—as, for instance, conductors having a greater or less number of surface corrugations, and the plain surfaces varying in position on the rolls. As seen in Fig. 3, these plain surfaces 8 match at the starting-point so as to form the flat surfaces 8$^2$, Fig. 4$^a$, at the seaming sides of the sheet next the seam-forming edges, as shown in Figs. 4$^a$, 5$^b$, 6$^c$, and 7$^d$, Sheet 4. This starting-point is so formed of plain surfaces as stated, to give a commencing-point for entering the sheet, and for this purpose the lower roll may have pins or stops 9 as a gage. When the conductor is in the form of a parallelogram, the lower roll must also have plain surfaces 10, for forming the angles or corners, and the upper roll need not necessarily have corresponding plain surfaces for these angles, as the corrugations of the roll will simply roll into the lower roll-spaces, 10, nor is it necessary for this reason to have any flat spaces at all on the upper roll. The sheet having been thus entered and corrugated is delivered upon carrying-belts C, which are mounted upon pulleys C', Figs. 1 and 3, placed beneath the table D, so that the said belts lie thereon in a plane with the meeting surfaces of the rolls, and having a continuous movement from said rolls across the table. These carrying-belts are operated by a shaft, 11, at the rear side of the frame, which is driven by a crossed belt, 12, leading from a pulley thereon to a pulley, 13, on a shaft, 14, mounted beneath the table and driven by pinion 15 from the large gear 1. Between the carrying-belts the table is provided with adjustable stops 16, against which the sheet is delivered from the corrugating-rolls by the said belts in position to be moved at right angles to the corrugating-rolls into the edge-trimming rolls between the cutters. This second movement of the sheet is effected by means of a push-bar, E, (shown in Figs. 11 and 12,) arranged to move above the table free of the carrying-belts at the end of the frame. This push-bar E has its pushing end turned down, Fig. 12, so that when moved in it strikes the edge of the corrugated sheet and pushes it forward. This push-bar is fixed to and carried by a rack-bar, E', supported in a groove or guideway, E², Figs. 1 and 3, in the table, said rack-bar being operated by a pinion, 17, fast on a short cross-shaft, 18, beneath the table. This cross-shaft 18 has loose-clutch bevel-wheels 19 on each side of said rack-pinion 17, and they engage with bevel-pinion 20 on the shaft 14, which is operated by the pinion 15 from the large clutch-gear 1, which is in constant motion and runs loose on the roll-shaft, the clutch device whereof may be of any suitable construction that will properly operate the corrugating-rolls. This cross-shaft 18 has on each side of the bevel-wheels 19 a sliding clutch, 21, Fig. 11, into which engage clutch-levers 22, which are pivoted at 23 and are connected by a link, 24, so that one of the clutch-levers 22 extends to the end of the table in position to be struck by a cam, 25, or incline, Fig. 11, which cam is carried on the inner face of a large clutch-gear, 26, fast on the lower roll-shaft. When the pushing-bar E is at rest, the sliding clutches are out of gear, and just as the sheet has passed through the corrugating-rolls the cam 25 comes in contact with the free end of the clutch-lever 22, which has an anti-friction roll, and moves it toward the corrugated rolls, moving its inner end in an opposite direction, so as to carry its clutch-slide 21 into gear with the bevel-wheel 19, which at this moment operates the pinion 17, which carries the rack E' inward, bringing the bent end of the push-bar E against the sheet and thus carrying it inward over the carrying-belts C and table and into the edge-trimming rolls, so that they, having a positive motion, will continue the forward movement of the sheet in the direction of the arrows 2', Fig. 1. The sheet having been thus carried to its limit by the push-bar, the latter is caused to immediately reverse its movement and be returned to its starting position. This reverse movement is effected by means of an incline, 27, Figs. 11 and 12, on the side of the rack-bar E', coming in contact with a horn, 28, on the inner end of the clutch-lever 22, to disengage its clutch-wheel 19, and by the link-connection 24 put the other clutch-wheel 19 in action and thus reverse the action of the pinion 17 to carry the rack-bar back. Just as the push-bar reaches the limit of its backward movement an incline, 29, Fig. 12, similar to 27, on the inner end of the rack-bar and on the opposite side thereof, strikes a horn, 30, on the other clutch-lever 22, disengaging it from the bevel-wheel 19, leaving both clutches out of action and the push-bar at rest, ready to repeat its pushing action upon the next sheet.

Figure 12:
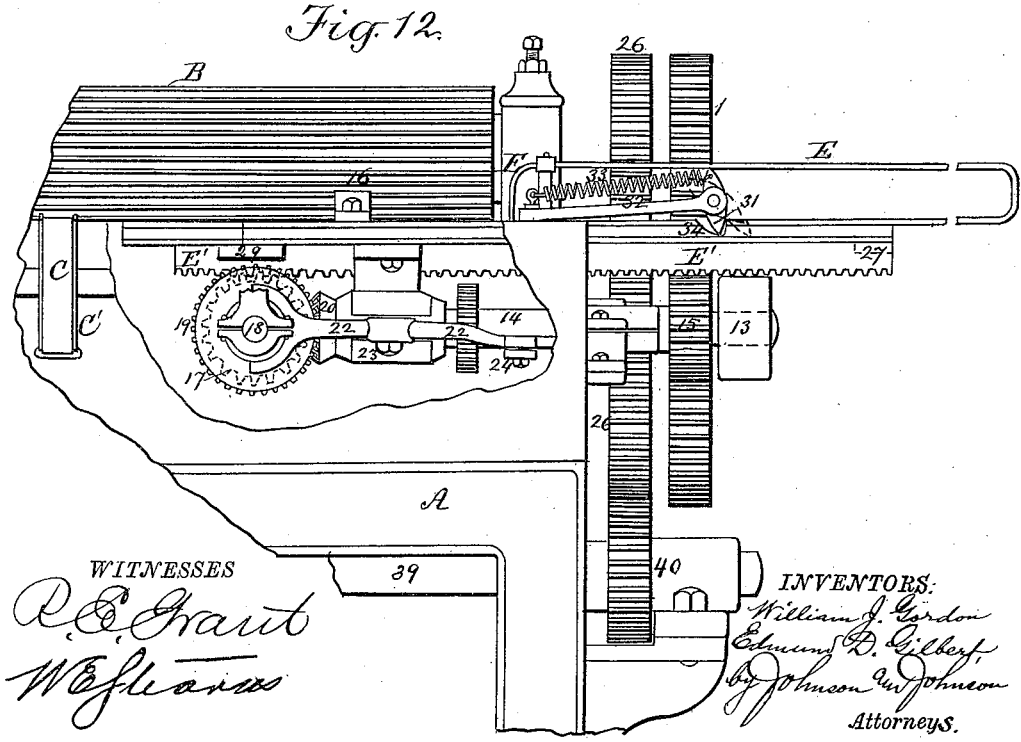

To insure the push-bar being carried to its full outward movement we use a spring-finger, 31, Fig. 12, pivoted in arms 32, fixed to the table, so as to allow the said finger to spring into a recess, 34, on the top of the rack-bar and by means of the spring 33 cause the finger 31 to push the rack-bar out to its limit to free the clutches. The finger 31 is caused to spring into the recess 34 as the rack-bar E' moves outward and the return movement of the latter turns said spring-finger in position, so that it rides on the rack-bar as the latter moves forward, and is thereby placed in position to exert a thrusting force upon the rack-bar, as shown by dotted lines in Fig. 12. As the sheet is pushed forward on the table by the push-bar E it passes under fluted rolls F F in front of the edge-trimming rolls, having their flutes spaced to match the sheet corrugations for guiding the sheet so that its edges will be trimmed parallel with its corrugations, and holding it flat upon the table. In this action the flat spaces of the sheet lie upon the table to allow the guide-rolls to press upon and guide the sheet without corrugating its flat spaces, as shown in Fig. 4ᵃ, so that the sheet is prevented from moving sidewise, and must therefore be moved in proper relation to the edge-operating rolls by the cross-grooved rolls and not by the edges of the sheet. The edge-trimming rolls G G, Fig. 4, are arranged one above the other, and are so formed as to bite at their sides upon the uncorrugated edges S², Fig. 4ᵃ, of the sheet and carrying it forward between them with a positive movement. They are suitably provided with circular cutters H H, Fig. 4, which lap at their edges, which trim the edges of the sheet to the proper width, as shown in Figs. 4 and 4ᵃ, and parallel with its corrugations. These cutters and rolls at one end of the shaft are adjustable upon the latter by feather and set-screw or other means, so that the cutters of each roll may be set nearer to or farther from each other to suit the size of the sheet that has been corrugated, and the adjustment of the edge-trimming cutters, as stated, is set to conform to the width of the corrugated sheet, according to different sizes of sheets. When the sections of the corrugating-roll are changed for others having different arrangement of corrugations, the cutters H must be correspondingly adjusted, and in this particular the corrugating-rolls and the edge-trimming cutters co-operate in their action upon different sizes of sheets. The sheet is fed from the edge-trimming rolls between edge-bending rolls I I, Fig. 5, which are formed so as to bite upon and continue the feed of the sheet by a positive movement, as the edge-trimming rolls are. They are formed with matching-shoulders I' and recesses I² in reverse positions at each end, so that the sheet edges S² may be turned one up and one down, as shown in Figs. 5 and 5ᵇ, so as to start the hook-laps for the seam. The sheet continuing to be fed passes between rolls J J', which are so formed as to receive the oppositely-bent edges S³ of the sheet and set or bend them to an acute angle, as shown in Figs. 6 and 6ᶜ, the rolls for this purpose having beveled grooves J² in reverse positions—that is, one roll of each shaft at opposite ends having beveled surfaces in reverse positions operating with flat-faced rolls J' J' on the other ends of the shafts. The sheet, continuing to be fed, passes between rolls K K', which are so formed, like the rolls J J', as to receive the acute-set edges, as shown in Figs. 7 and 7ᵈ, and flatten them a little more into the proper shape for interlocking to make the seam.

The object of using the three sets of rolls to form the edge seam-laps on the sheet is to bend the edge by successive steps to prevent the breaking of the metal and insure uniform widths in the bending of the laps. A single bending operation would not only be liable to break the metal at the bend, but be liable to bend it irregularly along its edges, and we have found the gradual forming of the laps to give the best results. Between these several rolls are placed fluted rolls F, which serve to guide and hold the sheet in place. Between the last two sets of rolls, in line with their biting-surfaces, are secured to the table guide-strips a², Fig. 8, oppositely beveled, which serve to receive the bent edges of the sheet and keep it straight and in line to enter the troughing-former. The sheet passes under one of these guide-strips and over the other, its oppositely-bent edges lapping the inclines of said strips, the upper one of which is made adjustable.

The several rolls G, I, J, and K are geared together, as in Fig. 1, so as to have equal movements, and they are operated by bevel-gear from the driving-shaft 3, as shown in Fig. 1, and these rolls are in continuous motion. As the sheet is fed from the rolls K K and floor-guides a², it is delivered upon the top edges of the sides L of a trough-former upon the top of a vertically-reciprocating table, L', between guides M, supported in brackets on a level with the top edges of the trough-sides, as shown in Fig. 9. Depending from housings above and at each end of the trough are fixed plates N, which are so arranged as to form abutments, over which the trough-sides L are forced when the table is elevated to form the sheet into a U or trough. For this purpose the depending plates N are arranged to pass between the vertical trough-sides, and the sheet rests upon the latter just beneath the lower edges of the abutment-plates N, when the trough-table is down, as in Fig. 9. The trough and the abutment-plates are of equal length, which is equal to that of the corrugated sheet, and as soon as the sheet is properly set therein the trough-table is caused to rise by the eccentrics 35 35 and their connecting-rods, 36. The eccentric shaft is operated by a large gear-wheel, 37, which meshes with a pinion, 38, on the shaft 39, which is operated by a pinion, 40, Figs. 2 and 3, meshing with the large gear 26, which is one of the driving-clutch gears before described, and the trough table-guides work in ways, as seen in Figs. 2, 9, and 10. The transmission of the sheet from the rolls K into the trough-former is effected by a vibrating pull-arm, O, depending from a rock-shaft, P, which is mounted in brackets on the trough-housing. This pull-arm O stands centrally with the path of the sheet, and has a pivoted catch, b, Fig. 28, so as to hook under the inner edge of the sheet as it leaves the rolls K and remove it in place in the table-trough for the operation which we have described. This catch is pivoted to a sleeve, c, which slides upon the arm O, so that the point of the catch b will always hang in position to catch back of the edge of the sheet as the arm moves back. The sleeve allows the pivoted catch b to ride on the next sheet as the arm vibrates, and the forward movement of the arm is so regulated as to leave the sheet in the proper position in the trough-former, as shown in Fig. 28. The vertical movement of the catch-sleeve c, to allow the catch to ride over the sheet in the arc described by the said arm, is caused by the arms c' of said sleeve riding upon inclines c², standing out from the housings of the trough-former, as shown in Figs. 1, 28, and 30.

The means for operating the vibrating catch-arm consists of a rock-arm, d, pivoted to the table, and connected by a link, d', to the crank-arm d² of the rock-shaft P. The rock-arm d has a lateral projection carrying a roll, d³, which receives the action of an eccentric, e, Fig. 29, on the shaft of the lower roll, K', by which the said catch-arm O is continually operated, so that it will take the sheet and remove it, as stated.

The trough-sides L and the side guides, M, are made adjustable to suit the width of the sheets for different sizes of conductors. The top of the trough-table has a rounded ridge, L², which serves to give the bottom of the sheet between its trough-sides a concave form, as shown in Fig. 10, for the purpose of causing the troughed sides of the sheet to remain in proper shape to enter between the die-jaws of the completing part of the mechanism. The troughed sheet is released by the descent of the table L' and at the time the succeeding sheet is being corrugated, and the troughed sheet is left free upon the trough-table until the succeeding sheet is carried against it, to push it out and give place to the succeeding sheet. It will be understood that the troughed sheet is incompletely corrugated, as stated, because it is necessary to leave on its edges certain plain surfaces, $S^2$, for the rolls to act upon to feed it in the edge-trimming and edge-bending operations. This incompleteness in its corrugations is made complete in the subsequent and final operation of the mechanism, in which the troughed sheet has its trough or open sides lapped and formed around a suspended core or form, its seam-forming edges hooked, its corrugations finished, and compressed into its proper shape. This compression sets and deepens the corrugations, these die-completing parts being corrugated to conform to the corrugations of the corrugating-rolls, as will be now described.

The operating devices of this completing operation are supported upon a suitable frame, A', which may be arranged in line with the delivering end of the frame A, or otherwise conveniently placed. These operating devices consist, essentially, of a suspended core or form of the exact size and shape of the conductor to be made, adapted to have a vertical and horizontal movement, lapping and seam-hooking jaws, and co-operating dies or jaws, which, when brought together, surround the core or form, with the completely-formed conductor between them. The core or form Q is of metal having a length a little greater than that of the conductor-section, and is in cross-section the exact form of the conductor. Its several sides are corrugated to match with the corrugated rolls, and its front end is suspended by a yoke-shaped carriage, Q', to which it is securely fastened, as shown in Figs. 19, 20, 21, and 22, while its rear end is supported upon a fluted roll, $f$, carried by a vertical slide, $f'$, Figs. 18 and 27, fitted in guides $f^2$ at the rear end of the frame. The core-carriage Q' is suspended by its yoke-arms upon ways or tracks $g$, Figs. 19 and 22, placed above and parallel with and on each side of the core or form. These ways are pivoted at their front ends to the lower end of a vertical slide, $g'$, Figs. 13, 14, and 25, fitted to move in guides $g^2$ at the front of the frame. The core-suspending carriage rides by rolls $g^3$, Fig. 22, upon the ways or tracks, while its inner end slides upon the adjustable fluted roll $f$, Fig. 20, as it travels horizontally back and forward the length of the conductor, as will be presently described. The rear ends of the ways or tracks $g$ are pivoted to fixed studs $g^4$, Fig. 20, of the frame, and it is upon these fixed pivots that the ways or tracks rise and fall at their front ends to elevate and depress this end of the core or form, while the rear end of the latter is at the same time and to the same extent elevated and depressed by the slide $f'$, operated by the cams $p$. This horizontal movement of the core or form is always in a horizontal plane to properly place it between the forming-die jaws to complete the conductor and to elevate it to the proper height above the die-jaws and the lapping-jaws to free the conductor of the latter to permit of the horizontal back movement of the core or form, to carry the formed conductor to the rear of the machine, so as to deliver it outside of the roll $f$. In this position the conductor is removed from the core and leaves the latter in position to be returned to receive the succeeding troughed sheet that has been placed within the die-jaws and under the suspended core or form for a repetition of the operation. The die-jaws consist of a fixed bed-die, $h$, suitably set in the frame A', side moving jaws, $i\ i$, and a top moving jaw, $j$, all having their acting surfaces corrugated to match the corrugations of the core and of the rolls B B', and these several die-jaws are of equal length with the conductor. The side die-jaws, $i\ i$, are fastened to suitable slide-holders, $i'$, fitted in guides $i^2$ on the bed of the frame, as shown in Figs. 15, 25, and 26. The top die-jaw, $j$, is secured to the lower face of a plunger, $k$, Fig. 15, which works vertically in guides $k'$, Fig. 17, on the inner sides of the end frames. These die-jaws, when brought together, form continuous corrugations around the conductor, and it is in this operation that the die-jaws complete the corrugations of the plain edges of the conductor and set the seam.

The lapping and seam-locking jaws $l$ are secured to suitable slides, $l'$, which are fitted upon the die-slides $i'$, as seen in Fig. 15, and these jaws $l$ are arranged to strike the vertical open sides of the troughed sheet and bend them over the top of the core, so as to hook the seam-forming edges, as seen in Figs. 14 and 25, and then move back, leaving the hooked edges in position to receive the action of the top die-jaw. These lapping jaws are of equal length with the die-jaws, and their movements inward are in advance of the inward movements of the die-jaws, and is the first action after the core or form is in place down between the side jaws, as seen in Figs. 14 and 25. The upper die-jaw, $j$, has two or more bottom spring-pins, $j'$, so placed as to form stops for that edge of the sheet which forms the overseam, Fig. 25, and hold it in its place in hooked position to keep the seam-edges locked while the latter are being set by the upper die-jaw. In this function the pins yield as the jaw descends upon the seam.

Referring to the horizontal reciprocating movements of the core or form, such movements are effected by the following operating connections: Connected with the core-suspending carriage Q' outside of and parallel with one of the ways or tracks is a rack-bar, $m$, Fig. 19, supported at its inner end in a swinging guide, $m'$, Figs. 17 and 20, having an open bottom to hold this end of the rack and allow its teeth to work into a pinion, $n$, loose upon the shaft $f^\times$, which carries a fluted roll, $f^3$, above the core in position corresponding to the fluted roll $f$ below the core. These fluted rolls $f$ and $f^3$ are driven by bevel-gears 41 from a vertical shaft, 42, at the rear side of the frame A', which will be presently described. As the upper roll, $f^3$, revolves in a direction with the movement of the core and its operating rack-bar it is necessary that the pinion $n$ should be loose on the roll-shaft, for the purpose of allowing it to be reversed in its moving direction without conflicting with the movement of the roll. This is done by placing a fixed pinion, $n^2$, Figs. 18$^a$ and 18$^b$, Sheet 11, on the roll-shaft, which meshes with an idle-pinion, $n^3$, which also meshes with a long pinion, $n^4$, which also meshes with the loose pinion $n$. In these figures the arrow shows the forward direction of the rack-bar, the direction of the loose pinion $n$, the direction of the roll-shaft, and the direction of the pinion $n^2$ on the roll-shaft. It will be seen that the roll-shaft travels in an opposite direction to that of the loose pinion $n$, and that the latter is made to move the rack-bar by the pinions $n^3$ $n^4$, the latter meshing with the loose pinion $n$. In the return movement of the rack-bar the directions of these pinions are reversed by the fixed roll-shaft pinion $n^2$, and in this way the core is positively moved in and out. Both these fluted rolls move in the same direction—that is, back and forth with the core. The upper roll-pinion, $n$, Figs. 19 and 20, being caused to operate the rack-bar to operate the core, because as the rack-bar is drawn out and returned, also by its carriage-connection, draws the core in and out. These fluted rolls, having a positive movement and clamping the core between them, as in Fig. 20, act in connection with the rack-bar to move the core with its conductor out and to return the core without the conductor to receive the succeeding troughed sheet. The vertical shaft 42, which operates these fluted rolls and the rack-bar, is itself operated by bevel-gear 43 at its lower end, Figs. 17 and 18, engaging with sliding clutch bevel-gear 44 on a horizontal shaft, 45, Figs. 17, 18, 31, 32, 33, and which are engaged and disengaged automatically by suitable clutch-connections, to be presently described. These clutch bevel-gears 44 are always in motion, and their shaft 45 has a pulley, 46, from which a belt, 47, leads to a pulley, 48, on the main driving-shaft 49, mounted at the rear side of the frame and projecting at the rear end, as seen in Figs. 17 and 18. As the core carries the conductor thereon between the swaging-rolls $f$ $f^3$ adjustable stripping-bars $w$ (seen in Figs 17, 18, and 27) spring or close in back of the front end of the conductor, and thereby form catches to hold the conductor, and thus cause it to be stripped off the core as the latter returns to its position to receive the next troughed sheet. These stripping-bars $w$ are adjustably secured in horizontal positions at the rear side of the frame in line with the center of the core when elevated, as in Fig. 27.

Referring to the vertical movements of the core Q, such movements are effected by the following operating connections: Connected to the vertical slide $g'$, to which the front ends of the carriage-ways $g$ are pivoted, is a link, $o^2$, Figs. 13 and 14, which is joined to a rock-arm, P, which is connected to a crank-arm, P', by an adjustable connecting-rod, P², by which the proper adjustment is made. The crank-arm P' stands outward and is fixed upon the front end of a horizontal rocking shaft, 50, mounted in bearings at each end of the frame near its bottom, while the rear end of this rocking shaft 50 has a similar crank-arm, P³, Figs. 17, 18, and 27, which is connected by an adjustable link, P⁴, to the slide $f'$, which carries the lower roll, $f$, upon which the rear end of the core is supported. These connections are operated by the vertical front slide, $g'$, which receives its motion from a revolving cam, $p$, Figs. 13 and 14, fixed upon the front end of a horizontal shaft, 51, Fig. 16, which has its bearings 52, Fig. 17, in the end frames at the top. This slide has rolls 53 at its upper end, between which the cam $p$ works to elevate and to depress the said slide to an extent to set the core in its depressed and elevated positions at both ends alike, maintaining the core in a horizontal position whether rising or lowering. The elevating movements of the slides $g'$ $f'$ and the core Q, connected therewith, are assisted by counter-weights V on arms V' of the shaft 50, as seen in Figs. 17 and 18, which weights constantly tend to balance the weight of said slides and the suspended core and keep the slide $g'$ in proper relation to its operating-cams.

Simultaneously with the rising of the core or form, and just as it reaches its upward limit, it is started out with the conductor by the following means: The crank-arm P³, which connects with the rear core-operating slide, $f'$, has a pin or stud, $g^5$, over which a slotted starting-link, $r$, works, connected at its lower end with a clutch-shifting lever, $r'$, Fig. 31, said link having an anti-friction roll, $r^2$, at its upper end, engaged to receive the lifting action of the cam $s$ on a vertical shaft, $s'$, mounted in bearings at the rear end of the frame. The slot $r^3$ of the link $r$ is L-shaped, and when the core or form is down the crank-arm pin $g^5$ is in the lower angle of the slot $r^3$, having been pulled there by the spring $r^4$, so that in this position the elevation of the crank-arm P³ lifts by its pin $g^5$ the slotted link $r$ a sufficient distance to operate the lever $r'$ to put the sliding clutch on shaft 45 in gear with the vertical shaft 42, and through its gear-connections 41 and the rack-bar $m$ thus starts and carries the form or core out horizontally from between the die-jaws.

Figure 20:
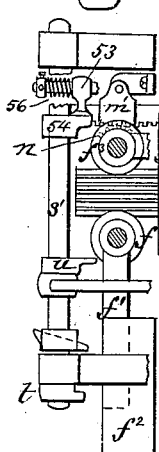

The means for reversing the movement of the form or core and returning it between the die-jaws will now be described. In Figs. 19 and 20 will be seen a rod, R, pivoted to the carriage Q', and loosely sliding through a swivel-eye, 53, seated in the slotted end of a crank, 54, fixed upon the vertical shaft $s'$ at the rear end of the frame. The rod R has an adjustable collar, 55, near its front end, which, as the rod moves back with the core, comes in contact with the swivel-eye 53, and, turning its crank 54 part way round outward, turns the shaft $s'$ a corresponding distance. The shaft $s'$ has a cam, $t$, Figs. 20 and 27, on its lower end arranged to act upon and push the slotted link $r$ inward at the time it is required to release the angle of the slot $r^3$ from the pin $q^5$ of the crank-arm $P^3$, and thus leave the link free to be depressed. This depression of the link is effected by a cam, $u$, Figs. 17, 20, and 27, on the shaft $s'$, arranged to act by a downward pressure upon the top of the said slotted link to press it down to the full limit of the slot $r^3$, for the purpose of operating the clutch-shifting lever $r'$ in a manner to reverse the action of the clutch-gears 44 on shaft 45, and thereby reverse the motion of the vertical shaft 42, which in turn reverses the action of the rack-pinion $n$ and the rolls $f$ and $f^3$, to carry the core or form back into place. The core or form is now traveling back, and just before it reaches the limit of its return movement a spring, 56, Figs. 19 and 20, on the inner end of the rod R, acts against the swivel-eyes 53 in the crank 54 and returns or moves said swivel inward in position to receive the next action of the collar 55. On this return movement of the shaft $s'$ the cam $s$ passes under the roll $r^2$, Fig. 27, on the shifting-link $r$, and by a lifting action raises the said link a distance equal to half the length of the slot $r^3$, which operates the clutch-lever $r'$ sufficient to draw the reversing clutch-gear 44 out of action with gear 43 on vertical shaft 42, and thereby stops the motion of the vertical shaft 42 to let the core remain at rest.

Referring to the action of the lapping-jaws, such action is effected by the following means: To the slides $l'$ of these jaws are connected by links $v$, Fig. 15, to rock-arms $v'$, depending from horizontal rock-shafts $v^2$, arranged on each side of the plunger $k$, and from these shafts extend upward rock-arms $v^3$, one of which carries two rolls, $v^4$ and $v^5$, arranged to receive the action of a cam, S, on shaft 51. The cam S, revolving in the direction of the arrow shown in Fig. 16, has just passed the top $v^5$ and forced the rock-arm $v^3$ out so as to move the arm $v'$ inward with the jaw $l$, as seen in Fig. 14. Meanwhile the cam S' on the same shaft acts against the roll $v^6$ on the rock-arm $v^3$, forcing it out and the arm $v'$ inward with the jaw $l$, so that both jaws stand inward to lap and hook the seam-forming edges. In this action it is important that the side of the troughed sheet that has the underlap should be bent over a little in advance of the top lap, so that the latter may be placed in the right position to be hooked in the overlap. It is also important that the jaw which bends the overlap should remain in position a little longer than the other jaw for the purpose of holding the upper lap to allow the hook of the lower lap to be certainly interlocked therewith, and it is in this action that the spring-pins $j'$ in the upper die-jaw co-operate to keep the upper lap in proper position for this interlocking. The opening of these lapping-jaws is effected by the rolls $v^4$ and $v^7$ both operating in connection with the cams S S' to draw the rock-arms $v^3$ inward at the proper time, as shown in Fig. 15. Provision is made for adjusting these rock-arms by slotted disks and bolts, as seen in Fig. 15, to set the lapping-jaws to suit different-sized conductors with different-sized cores or forms.

Referring to the operation of the die-jaws $i$, they are operated by the following means: At each side of the bed of the frame A' are horizontal shafts T, suitably mounted, and each provided with a suitable number of cams, T', arranged to act upon the rear side of the said jaw-slides, as seen in Fig. 15. These cams have arms $T^2$, to which are connected adjustable connecting-rods $T^3$, which by straps are connected with and operated by eccentrics $T^4$, fixed on the shaft 51 in such relation to each other as to give these die-jaws simultaneous movement toward the suspended core. The cams T' act upon rolls in the jaw-slides, and the adjustment of the rods $T^3$ is to properly govern the extent of movements of the cams in relation to the die-jaws. The outward movements of these jaw-dies are effected by straps $T^5$, Figs. 15 and 17, connected to the rear sides of the die-slides and passing over and upon loose sleeves on the shafts T, and having weights $T^6$, by which the die-slides are constantly kept up against their cams, as seen in Figs. 15 and 17.

Referring to the action of the plunger-die $j$, it is operated by the following means: The plunger $k$ is knuckle-jointed to vertical adjustable connecting-rods U, Figs. 15 and 17, which are connected by straps to eccentrics U' on the shaft 51, and these eccentrics are so arranged as to operate the plunger-die to compress the seam and to help finish the corrugations of the seamed side of the conductor, such operation being coincident with that of the side die-jaws. The plunger-die is raised by the eccentrics high enough to allow the suspended core or form to be raised high enough to admit the introduction of the troughed sheet between the die-jaws under the core and to allow clearance between said plunger-die and the core, to permit the latter to carry the conductor out. The action of this plunger-die in its descent sets the seam, corrugates the plain spaces $S^2$ on each side of the seam-forming edges and swages in the two upper corners at $8^4$, Figs. 36 and 37, of the inner end of the conductor, while its two lower corners are in like manner swaged in at $8^4$ by the bed-die $h$. These swaged-in corners are to facilitate the free joining of the conductor-sections, and they are produced by projections $w^2$ on the said die-surfaces and grooves $w^3$ at the angles at the inner end of the core, as seen in Fig. 24. The corners of the core Q at its inner end are grooved at $w^3$, to allow the swaged-in end of the conductor to readily pass off the core.

It will be observed that the operation of completing the function of the conductor is effected from the shaft 51 and its connections, and that the horizontal traversing movements of the core and the delivering of the conductor are effected from the shaft 49 and its connections. While, therefore, the conductor is being delivered between the swaging-rolls $f f^3$, the lower roll, $f$, is held firmly against the conductor by means of a vertical prop, $x$, Figs. 18 and 27, connected to the end of the crank-arm $P^3$, and resting upon a lug, $x'$, at its lower end, as in Fig. 18. This prop is released at the proper time by means of a roll, $x^2$, on a clutch-connecting rod, $x^3$, which connects with a treadle-arm, $V^2$, at the rear end of the frame, the treadle, $V^3$ being arranged at the front end of the frame and having the arm $V^2$ on its shaft, and the said prop being pushed off its foot-abutment $x'$ sidewise by the downward movement of the roll-carrying rod $x^3$ against an incline, $x^4$, on the prop. This release of the prop allows the slide $f'$ and its roll $f$ to be free to descend at the proper time. The prop $x$ swings into place over its foot-abutment $x'$ when the slide $f'$ is raised. The depression of the treadle $V^3$, while releasing the swaging-roll prop, also engages the driving-clutch $V^4$ on shaft 51 with the large gear $V^5$ loose on said shaft, which, by the pinion 57, is always in motion, and thus starts the various operating devices controlled by the shaft 51. The depressing action of the foot-lever pulls the clutch-yoke $x^5$ out of the clutch-ring $V^4$ to allow the clutch-pins $x^6$, Figs. 17, to spring into hub-recesses on the large gear $N^5$ to operate the shaft 51, said clutch action being shown in Figs. 17 and 18; but any suitable form of driving-clutch may be used for this purpose. When the plunger-die rises, this clutch acts to stop the shaft 51, which stops its operating-connections and leaves the core up and the die-jaws open, and to prevent the said shaft from being started at an improper time a swinging safety-latch, W, Figs. 13, 14, and 25, pivoted to the rock-arm P, hangs in position to engage with a link, W', pivoted to the front end of the frame, and connected with the treadle $V^3$ by a vertical link $W^2$, so that before the treadle can be depressed to start the shaft 51 the shaft-latch W is disengaged by hand.

To positively stop the shaft 51 and prevent its momentum from carrying it beyond its stopping-point, a rod, $y$, connected with the treadle-link W', extends up in position to be struck by a lug, $y'$, on the inner side of the cam $p$, and thus stop the shaft 51 at the proper time, as seen in Fig. 14 in dotted lines. The large gear-wheel $V^5$ is kept in motion by the pinion 57 on the shaft 49, which latter is driven by the belt-wheel Z, the said shaft having also a balance-wheel, Z', to give uniform speed.

Briefly referring to the operation of the mechanism, the sheet is corrugated and delivered in position to be carried by the push-bar E to the action of the edge-trimming, edge-bending, and edge hook-forming rolls, from whence it is passed by the pull-arm $o$ into the troughing form, wherein it is bent into a trough or U shape, where it remains until pushed out by the succeeding sheet, and in which form it is passed into the die-jaws under the suspended core or form, where it is completely corrugated, seamed, and swaged into form with its ends crimped or set in at the corners. The die-jaws are then opened, the core elevated with its conductor and moved out beneath the upper die-jaw and between the grooved rolls $f f^3$, which further set the seam, flatten the angles of the conductor, and loosen it, so that it can be easily removed from the core or form, as seen in Fig. 27, by the action of the stripping-catches $w$ during the return of the core to its position to receive the succeeding troughed sheet, which is already prepared and delivered from the trough-former by the action of the incoming sheet as it leaves the hook-forming rolls. As one sheet is being troughed the corrugating of the succeeding sheet takes place.

By changing the size and form of the suspended core and of the die-jaws, different sizes and forms of conductors can be made by adjusting the corrugating-rolls with different sections corresponding with the different sizes and forms of conductors. It is to be understood that by making necessary changes in the corrugated rolls, so as to make different sizes of conductors required in the market—as for instance, a large building requires large conductors, small buildings require small conductors—such changes are always made so that the corrugations made on the sheet will conform with the grooved guide-rolls.

In making round corrugated conductors the corrugated rolls have to be changed, different sections are required to be placed on the roll, and when the sheet is passed through the rolls the corrugations conform exactly with the guide-rolls, so that it matters not what the form or size of the conductor is the sheet when passed through the corrugating-rolls conforms with the guide-rolls. The changing of the sections of the corrugating-roll must always correspond with the guide-rolls, no matter what the size or form of the conductor may be.

In mechanism for the manufacture of sheet-metal corrugated conductors, we claim—

1. The combination, with the sheet-corrugating rolls, of the table D, the pushing-bar E, arranged to receive the corrugated sheet from said rolls, and rolls constructed and arranged to receive the corrugated sheet from said pushing-bar at right angles to its delivery from said corrugating-rolls, and to feed, trim, and bend its edges parallel with its corrugations, substantially as described, for the purpose specified.

2. The combination, with the sheet-corrugating rolls B B' and the automatically-operating push-bar, of the rolls for feeding, trimming, and bending the edges of the sheet, and the grooved guiding-rolls matching the corrugations of the rolls B B', whereby the sheet is held and guided in its passage between said edge-operating rolls, as set forth.

3. The combination, with the sheet-corrugating rolls B B', the table D, the carrying-belts C, and the gages 16, of the cross-rolls G I J K and the pushing device E, the several parts being constructed and operating substantially as described, for the purpose specified.

4. The combination, with the corrugated rolls, the table D, and the cross-rolls G I J K, of the pushing device, consisting of the push-bar E, the rack-bar E', having the inclines 27 and 29, the pinion 17, the shifting-clutch device operated by the connected levers 22, having the horns 28 30, and the cam 25 of the gear 26, whereby the pushing-bar is moved forward and back by the operation of the corrugated rolls, substantially as described, for the purpose specified.

5. The combination, with the sheet-corrugating rolls, the push-bar E, mechanism for operating it, and a table upon which the sheet is delivered from said rolls, with gages 16, and rolls for feeding, trimming, and bending the edges of the sheet, substantially as described.

6. The combination, with the sheet-corrugating rolls, a table, and a horizontally-reciprocating push-bar arranged to operate thereon, of the guiding-rolls F F, the trimming-rolls G G, the bending-rolls I I, and the rolls J J and K K, constructed to receive and guide the sheet from the push-bar, trim its edges, and successively bend and flatten them to acute angles in opposite directions during the feed of the sheet.

7. The combination, with the sheet-corrugating rolls, table D, and the rolls for guiding, trimming, and bending the edges of the sheet, as described, of the automatically-operating push-bar E and its shifting mechanism, substantially as described, for the purpose specified.

8. The sheet-corrugating rolls, one or both constructed with plain surfaces 8 and 10, and a starting-point, 6, disposed to form plain margins on the sheet, in combination with rolls constructed to feed the corrugated sheet, trim and bend its edges, as described, for the purpose stated.

9. The combination, with the sheet-corrugating rolls, a table, and a horizontally-reciprocating push-bar arranged to operate thereon, of the rolls G, I, J, and K, and the guide-strips $a^2$, all constructed to operate substantially as described, for the purpose specified.

10. The combination, with the sheet-corrugating rolls, the fixed table D, and the rolls for feeding, bending, and guiding the sheet to prepare its edges with the seam-laps, of a trough-forming device consisting of a fixed and moving part operating to form said sheet into a U shape, and means operating to feed the said sheet from the said feeding, trimming, and bending rolls to the said trough-forming device, substantially as described, for the purpose specified.

11. The combination, with the sheet-corrugating rolls and the rolls for guiding and feeding, trimming, and bending the edges of the sheet, and means for delivering the sheet thereto from the corrugating-rolls, of a trough-former and means for automatically delivering said sheet thereto from said feeding, trimming, and bending rolls to be bent into a U shape, substantially as described, for the purpose specified.

12. The rolls G I J K, the trough-forming device, and the device for delivering the sheet from the rolls into said trough-forming device, combined and operated conjointly and for the purpose set forth.

13. The combination of the sheet-corrugating rolls, one of which is constructed in sections for adjustment, as described, and a pushing device, with adjustable rolls G I J K, the vibrating finger device, and an adjustable trough-forming device, whereby the same machine may be arranged to make conductors of different sizes, as described.

14. The devices, in combination, consisting of the corrugated rolls B B', the pushing device E, the cross-rolls G I J K, the transferring-catch device $b$, and the trough-forming device, with operating connections constructed and organized to operate certain of the devices intermittingly and certain of the devices continuously, substantially as described, for the purpose specified.

15. The sheet-transferring device consisting of a pull-arm, O, rock-shaft P, pivoted catch or pawl $b$, its carrying-sleeve $c$, having arm $c'$, the fixed inclines $c^2$, and means connected with the roll K, for operating said catch-arm, substantially as described, for the purpose specified.

16. The trough-forming device consisting of a vertically-moving table having vertical trough-forming sides L L and fixed depending abutments N N, arranged to pass between the table sides, in combination with rolls arranged and constructed to feed, trim, and bend the edges of a sheet, and means arranged between the said rolls and the trough-forming device for automatically delivering the sheet into said trough-former from the rolls, substantially as described, for the purpose specified.

17. The trough-forming device consisting of a vertically-moving table, L', a central ridge, $L^2$, and vertical adjustable sides L L, and a housing having depending abutments N N and adjustable guides M M, forming an extension of the frame A, having rolls G I J K, arranged crosswise thereon, and the corrugated rolls B B', arranged at the side of said table at right angles to said cross-rolls, in combination with a pushing device, E, and a vibratable transferring-catch device, $b$, constructed and operating substantially as described, for the purpose specified.

18. In combination, the sheet-corrugating rolls, the push-bar, the rolls for trimming, bending, and setting the edges of the sheet, the guide-rolls matching the corrugations of the sheet fed by said edge-operating rolls, and means for operating the several devices in their proper order, substantially as described.

19. The combination, with fixed and movable die-jaws, of a suspended core or form therefor having a vertical and a horizontal movement in relation to said die-jaws, substantially as described, for the purpose specified.

20. The combination, with fixed and movable die-jaws, of a suspended core or form therefor having a downward movement to place it in position as a die-core over which the said die-jaws form said conductor, and a rising movement to carry the conductor formed thereon free of the said dies in position to be moved horizontally out of the dies with said conductor.

21. The combination, with the fixed and movable die-jaws, a die-core therefor, and movable lapping-jaws $l\ l$, of the spring-pins $j'$ in the upper die-jaw, whereby to hold the seam-laps in proper position while setting the seam, substantially as described.

22. The combination, with the fixed bed-die $h$, reciprocating side dies, $i\ i$, and a vertically-reciprocating top die, $j$, of a core-die, Q, over and upon which the conductor is formed and completed, means for suspending said core-die, and means for operating it vertically and horizontally in relation to said movable and fixed dies, substantially as described, for the purpose specified.

23. The combination, with fixed and movable die-jaws and a suspended core or form, of means for suspending and supporting the latter and operating it vertically in relation to said die-jaws, consisting of the suspending-carriage $Q'$, the trackways $g\ g$, the supporting-roll $f$, the slide $g'$, the cams $p\ p$, the connecting rock-arms P P', their connecting-rod $P^2$, the rock-arm $P^3$, its connecting-rod $P^4$, and the rock-shaft 50, operating said rock-arms, whereby the die-core is raised and lowered alike at both ends.

24. The combination, with fixed and movable die-jaws and a core or form suspended at one end and supported at the other, of means for suspending and supporting the latter and operating it vertically and horizontally in relation to said die-jaws, consisting of the suspending-carriage $Q'$, the trackways $g\ g$, the supporting-roll $f$, the slide $g'$, the cams $p\ p$, and operating connections P P' $P^2$ $P^3$ $P^4$ 50, and the rack-bar $m$ and its connecting operating-gear device, and roll $f^3$, whereby the die-core is moved horizontally into and out of the die-jaws, as stated.

25. The combination of fixed and movable die-jaws and a movable die-core or form with means for suspending and supporting the latter in proper relation to said die-jaws, consisting of a carriage, $Q'$, pivoted trackways $g\ g$, the vertically-adjustable roll $f$, and the vertical slide $g'$, substantially as described, for the purpose specified.

26. The combination, with fixed and movable die-jaws, of a die-core or form suspended at one end and supported at the other, and having a vertical and a horizontal reciprocating movement, the latter for carrying the formed conductor out with it for delivery, of means for automatically removing the conductor from the core as the latter is returning to position within the die-jaws, consisting of the stripping-catches $w$, arranged at the outside of the rolls $f\ f^3$, substantially as herein set forth.

27. The combination, with fixed and movable die-jaws and a die-core or form therefor having both vertical and horizontal movements, of the suspending-carriage $Q'$, for the front end of said die-core, and the supporting-rolls $f\ f^3$, for the rear end of said core, of means for operating said rolls in opposite directions, consisting of the vertical shaft 42, the gears 41, the horizontal shaft 45, the clutch-gears 43 and 44, the pulleys 46 and 48, and the clutch-controlling connections, substantially as described, for the purpose specified.

28. The combination, with fixed and movable die-jaws, of a core or form, and mechanism for sustaining and operating it vertically, mechanism for operating it horizontally back and forth, mechanism for limiting its reciprocating movements, and mechanism for reversing such movements, substantially as described, for the purpose specified.

29. The combination, with the fixed and movable die-jaws, and a die-core or form therefor having both vertical and horizontal movements, of means for sustaining the die-core, arranged at the opposite ends outside of and free of the said jaw-dies, whereby the vertical movement of the die-core is controlled within the space formed between the four coacting faces of the die-jaws, substantially as described, for the purpose specified.

30. The combination, with fixed and movable die-jaws and a die-core or form suspended at one end and supported at the other, and having a vertical and a horizontal reciprocating movement, of means for governing the extent of the horizontal movement of said die-core, consisting of the suspending-carriage $Q'$, the pivoted sliding rod R, having the stop 55 and cushion-stop 56, the swivel-eye 53, crank-arm 54, and its vertical operating-shaft $s'$, and means for connecting said shaft with the means which govern the vertical movement of said die-core in unison with its back-and-forth travel, substantially as described.

31. The combination, with fixed and movable die-jaws and a die-core, Q, having vertical and horizontal movements, substantially as described, of means for operating the top and side die-jaws, consisting of the eccentrics U' and their connecting-rods U, the eccentrics $T^4$, their connecting-rods $T^3$, the cams T', and the weights $T^6$, substantially as described, for the purpose specified.

32. The combination, with fixed and movable die-jaws, a die-core or form therefor having both vertical and horizontal movements, and lapping-jaws $l\ l$, of means for operating the said die and lapping jaws, consisting of the eccentrics U' and $T^4$, the cams T' and the weights $T^6$, the lever-connections $v'$ $v^2$, and their operating-cams S S', substantially as described, for the purpose specified.

33. The combination, with fixed and movable die-jaws, of a suspended core or form having vertical and horizontal movements, means for balancing the weight of the latter, consisting of the weight V, rock-shaft 50, connecting-arms V', and means whereby said rock-shaft 50 is connected with said die-core or form, substantially as described, for the purpose specified.

34. The combination, with fixed and movable dies, a die-core or form therefor having vertical and horizontal reciprocating movements, and means for sustaining said die-core at both ends, of means for controlling the reciprocating movements of the core by the action of the vertical movements of said die-core, consisting of the bar or link $r$, having the slot $r^3$, the crank-arm $P^3$, having pin $q^5$ and slide-connection $P^4$, the vertical shaft $s'$, having the cams $s$ $t$ $u$, and the shifting clutch-lever connection $r'$, substantially as described, for the purpose specified.

35. The combination, with the die-core Q, having grooves $w^3$ at the angles at its inner end, and the top and bottom die-jaws, $j$ $h$, having the corresponding projections $w^2$, of the rolls $f$ $f^3$, co-operating with said grooves and projections to completely close the seam of the conductor and set its angles upon the core, substantially as described, for the purpose specified.

36. The forming die-core Q, having grooves $w^3$ at the angles at its inner end, in combination with the top and bottom die-jaws, $j$ and $h$, having the projections $w^2$ at their inner ends matching the grooves $w^3$, whereby to form the swaged-in recesses $8^4$ in the end of the conductor-section and allow it to be slid off of the core, substantially as described.

37. The combination, with fixed and movable die-jaws and a core or form having vertical and horizontal movements, substantially as herein described, of a treadle, $V^3$, its clutch-connection $x^3$, the stop $y'$ of the cam $p$, the connections $W^2$ and Y, and the safety-hook W, whereby the operating devices are locked to the treadle and released for operation, substantially as described.

In testimony whereof we have hereunto set our hands in the presence of two subscribing witnesses.

WILLIAM J. GORDON.
EDMUND D. GILBERT.

Witnesses:
ALBERT W. COX,
CHARLES CARVER.